(12) United States Patent
Rehtanz et al.

(10) Patent No.: US 6,985,800 B2
(45) Date of Patent: Jan. 10, 2006

(54) PROTECTION OF AN ELECTRIC POWER TRANSMISSION NETWORK

(75) Inventors: Christian Rehtanz, Baden-Dättwil (CH); Martin Naedele, Zürich (CH); Joachim Bertsch, Kilchberg (CH)

(73) Assignee: ABB Research Ltd., Zurich (CH)

( * ) Notice: Subject to any disclaimer, the term of this patent is extended or adjusted under 35 U.S.C. 154(b) by 55 days.

(21) Appl. No.: 10/697,038

(22) Filed: Oct. 31, 2003

(65) Prior Publication Data

US 2004/0090725 A1 May 13, 2004

(30) Foreign Application Priority Data

Nov. 1, 2002 (EP) .................................. 02405935

(51) Int. Cl.
*H02H 3/00* (2006.01)

(52) U.S. Cl. ...................... 700/292; 700/293; 700/294; 361/65; 361/66

(58) Field of Classification Search ................ 700/292, 700/293, 294; 361/65, 66
See application file for complete search history.

(56) References Cited

U.S. PATENT DOCUMENTS

| | | |
|---|---|---|
| 6,330,141 B1 | 12/2001 | Elms |
| 2004/0010350 A1 * | 1/2004 | Lof et al. .................. 700/292 |

FOREIGN PATENT DOCUMENTS

| | | |
|---|---|---|
| DE | 001134867 A1 * | 9/2001 |
| EP | 1 134 867 A1 | 9/2001 |
| EP | 1-211 775 A1 | 6/2002 |
| EP | 1 324 455 A1 | 7/2003 |

OTHER PUBLICATIONS

"Balanced Power: The Next Generation"-1998 Live Sound International Magazine. http://www.equitech.com/articles/bpng.html.*
Chen et al, "A New Adaptive PMU Based Protection Scheme for Transposed/Untransposed Parallel Transmission Lines", *IEEE Transactions on Power Delivery*, vol. 17, No. 2, pp. 395-404 (2002), XP001162855.
Xia et al, Adaptive Relay Setting For Stand-Alone Digital Distance Protection, *IEEE Transactions on Power Delivery*, vol. 9, No. 1, pp. 480-491 (1994), XP002249981.
Anderson, P.M., "Analysis of faulted power systems", ISBN 0-7803-1145-0, IEEE Press, 1995, pp. 37-53.
Anderson, P.M., "Analysis of faulted power systems", ISBN 0-7803-1145-0, IEEE Press, 1995, pp. 347-353.

* cited by examiner

*Primary Examiner*—Leo Picard
*Assistant Examiner*—Michael D. Masinick
(74) *Attorney, Agent, or Firm*—Buchanan Ingersoll PC

(57) ABSTRACT

For the control of an electric power transmission network, where local protection functions are implemented by a plurality of local protection devices (3,3a,3b,3b',3c) located at a plurality of locations throughout the network, the following steps are executed
 measuring phasor data for voltages and currents at a plurality of locations (A,B) of the network,
 transmitting said phasor data to a central processing device (2),
 emulating, in the central processing device (2), protection functions that are implemented in the local protection devices (3,3a,3b,3b',3c), and
 executing, in accordance with a given redundancy strategy, control commands that are issued redundantly by the local protection devices (3,3a,3b,3b',3c) and by the central processing device (2).

In a preferred variant of the invention, values of predetermined parameters that are used in the protection function, in particular protection threshold values, are adapted to measured values.

11 Claims, 2 Drawing Sheets

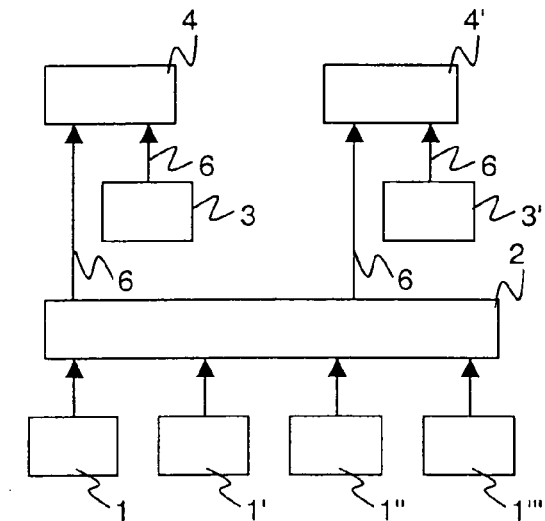
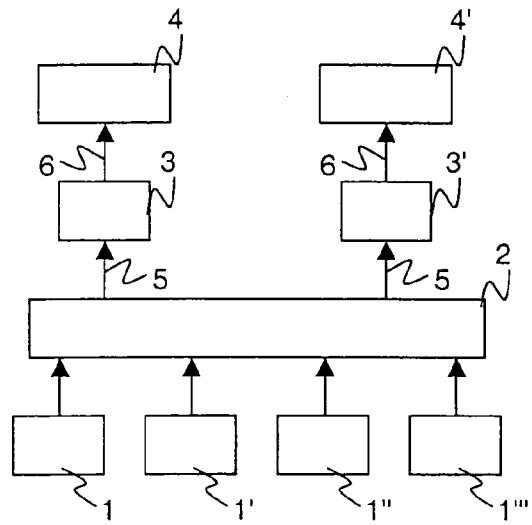
Fig. 1  Fig. 2
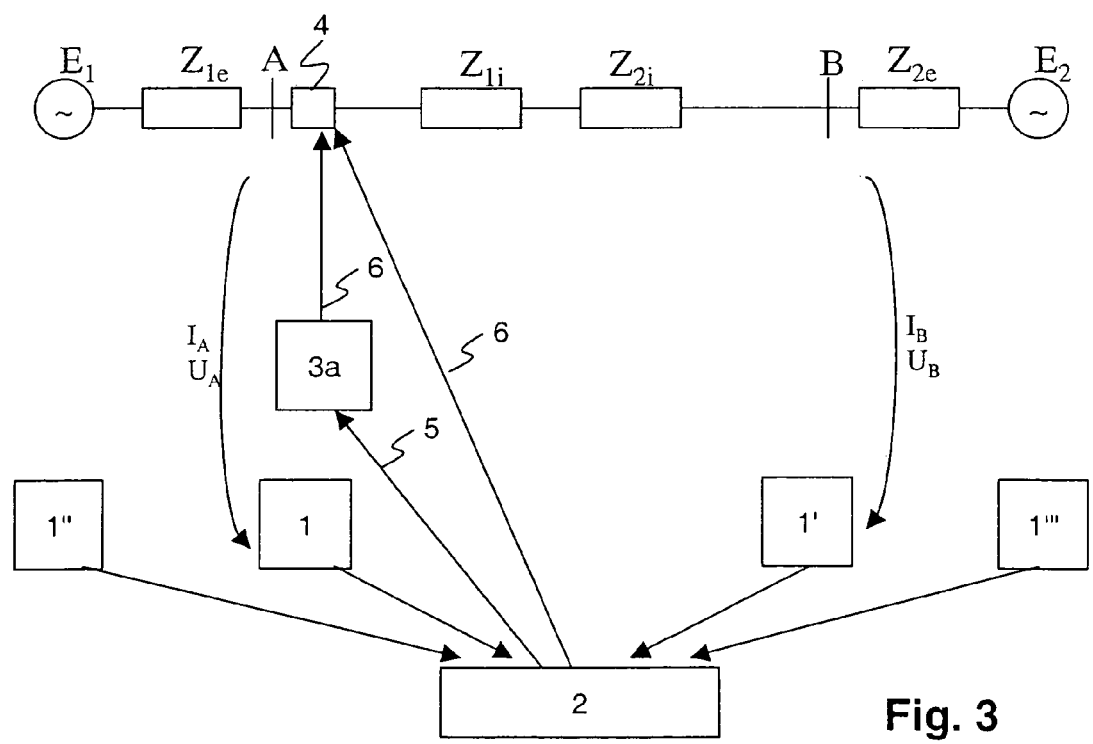
Fig. 3

PROTECTION OF AN ELECTRIC POWER TRANSMISSION NETWORK

FIELD OF THE INVENTION

The invention relates to large-scale electric power transmission networks, and, more particularly, to a method, computer program and data processing system for the protection of an electric power transmission network as described in the preamble of claim 1, 9 and 10, respectively.

BACKGROUND OF THE INVENTION

Electric power transmission and distribution systems or networks comprise high-voltage tie lines for connecting geographically separated regions, and substations for transforming voltages and for switching connections between lines. Power generation and load flow in a network with several substations is controlled by a central energy management (EMS) system. Protection of network components, in particular lines, is achieved by control devices and methods, and in particular by protection devices that continuously measure e.g. currents, voltages, temperatures etc. locally and locally disconnect lines or other components when these measurements indicate an emergency, overload or fault condition. Such protection devices are e.g. overcurrent relays, differential protection devices, phase comparison relays or distance protection relays.

Due to very high reliability requirements, protection devices with associated measurement and communication units are often implemented redundantly. This increases the overall system cost accordingly. It is therefore desirable to provide redundant protection functions at a lower cost.

DESCRIPTION OF THE INVENTION

It is therefore an object of the invention to create a method, computer program and data processing system for the protection of an electric power transmission network of the type mentioned initially, which provide redundant protection functions at a lower cost.

These objects are achieved by a method, computer program and data processing system for the protection of an electric power transmission network according to the claims 1, 9 and 10.

According to the inventive method, for an electric power transmission network, where local protection functions are implemented by a plurality of local protection devices located at a plurality of locations throughout the network, the following steps are performed:
  measuring phasor data for voltages and currents at a plurality of locations of the network,
  transmitting said phasor data to a central processing device,
  emulating, in the central processing device, protection functions that are implemented in the local protection devices, and
  executing, in accordance with a given redundancy strategy, control commands that are issued redundantly by the local protection devices and by the central processing device.

Since networks are, for other purposes, increasingly equipped with phasor measurement units, the inventive method allows a cost-effective implementation of redundant protection functions. Furthermore, providing a redundant system with a different technology is better than e.g. simply duplicating existing equipment.

In a preferred variant of the invention, the protection functions emulated in the central processing device are one of a differential protection function, a phase comparison function, an overcurrent detection function, a thermal overload detection function, or a distance protection function.

In a further preferred variant of the invention, values of predetermined parameters that are used in the protection function are adapted to measured values. This allows, on the one hand, incorporating updated estimates of network parameters, such as line impedances or equivalent model source voltages. These parameters are used, explicitly or implicitly, in the protection functions and are, according to the state of the art, assumed to be constant. On the other hand, this variant allows heuristically adapting limit values of conventional protection devices to changing network conditions, in particular to network stability.

In a preferred embodiment of the method according to the invention, a distance protection function for a power line linking a first bus of the network to a second bus of the network is realized, and the method comprises at least one of the steps of
  determining, an equivalent representation of the network as observed at the first bus, and
  determining an equivalent representation of the network as observed at the second bus, and the step of
  computing a distance protection algorithm that incorporates at least one of the equivalent representations of the network as observed at the first or second bus, respectively.

Distance protection is improved since the plurality of phasor measurements involved in the inventive method gives a larger and better view of the system condition than just measurements made at one single location.

The computer program for the control of an electric power transmission network according to the invention is loadable into an internal memory of a digital computer, and comprises computer program code means to make, when said computer program code means is loaded in the computer, the computer execute the method according to the invention. In a preferred embodiment of the invention, a computer program product comprises a computer readable medium, having the computer program code means recorded thereon.

A data processing system for the control of an electric power transmission network according to the invention comprises means for carrying out the steps of the method according to the invention. In a preferred embodiment of the invention, the data processing system is an apparatus comprising a data processor, a memory coupled to the processor and computer program code means stored in said memory, where said computer program code means, when executed by the processor, causes the method according to the invention to be executed.

Further preferred embodiments are evident from the dependent patent claims.

BRIEF DESCRIPTION OF THE DRAWINGS

The subject matter of the invention will be explained in more detail in the following text with reference to preferred exemplary embodiments that are illustrated in the attached drawings, in which:

FIG. 1 schematically shows an information flow and function structure of a system providing backup protection according to the invention;

FIG. 2 schematically shows an information flow and function structure of a system for adapting conventional protection devices according to the invention;

FIG. 3 schematically shows an information flow and function structure for redundant overcurrent protection;

The reference symbols used in the drawings, and their meanings, are listed in summary form in the list of reference symbols. In principle, identical parts are provided with the same reference symbols in the figures. Arrows linking boxes denote a flow of information.

DETAILED DESCRIPTION OF PREFERRED EMBODIMENTS

Figure 4:
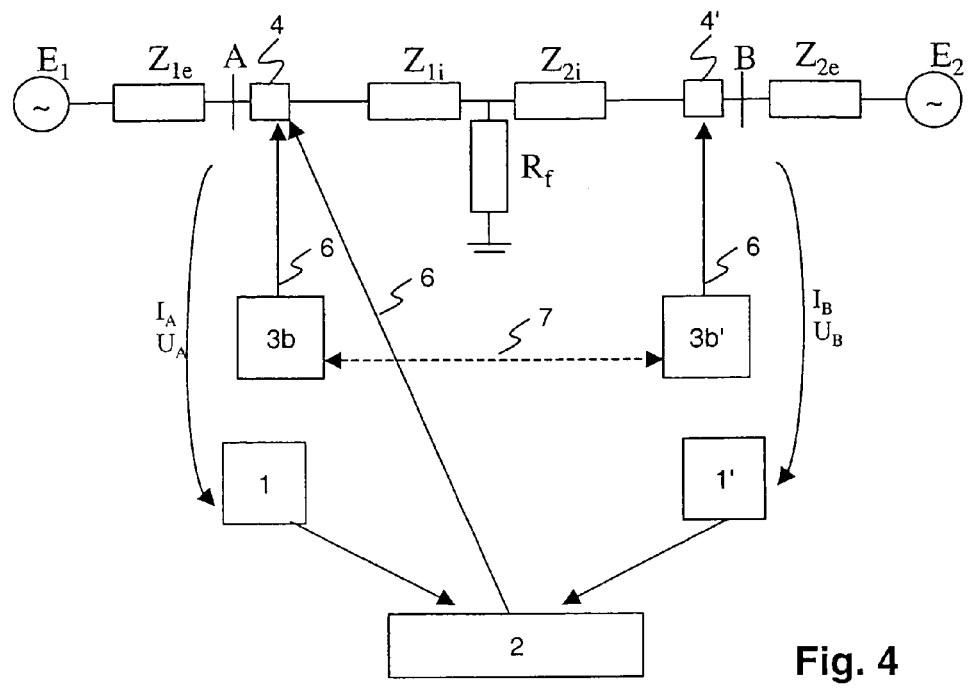
FIG. 4 schematically shows an information flow and function structure for redundant differential protection.

FIG. 1 schematically shows an information flow and function structure of a system providing redundant or backup protection according to the invention for a line located between a first bus A with a second bus B. A plurality of phasor measurement units 1,1',1",1'" is arranged to transmit synchronised phasor data to a central processing device 2. In particular, a first phasor measurement unit 1 measures a voltage phasor $U_A$ at the first bus A and a current phasor $I_A$ flowing from bus A into the line. Similarly, a second phasor measurement unit 1' measures a voltage phasor $U_B$ and a current phasor $I_B$ at the second bus B. The central processing device 2 is arranged to transmit switching commands 6 to circuit breakers 4,4', either directly or through a substation control system controlling the circuit breakers 4,4'. The circuit breakers 4,4' are also, according to the state of the art, controlled by local protection devices 3,3'. In the preferred embodiment of the invention shown in FIG. 1, the circuit breakers 4,4' disconnect an associated line or device if a switching command 6 is received from either a local protection device 3,3' or from the central processing device 2. In another preferred embodiment of the invention, not illustrated, the switching commands 6 from the central processing device 2 are transmitted to the local protection devices 3,3' or to a decision making device, by which other redundancy strategies are implemented. Such strategies are, for example:

- Self-diagnosis of the local protection device: if a malfunction is detected, switching commands from the local protection device are suppressed and only switching commands 6 from the central processing device 2 are forwarded to the circuit breakers 4,4'.
- In the case of triple redundancy, switching only if at least two of the three command sources agree.
- Staggered forwarding of switching commands 6. For example, a switching command 6 originating from the central processing device 2 is delayed by e.g. 50–250 milliseconds, and is only issued, if the conditions for switching still hold after that delay time.

Since the redundancy achieved through the inventive method uses different devices and communication means than the conventional approach, the redundant system is, with respect to software errors, more reliable than a redundant system made by simply duplicating conventional protection devices.

Phasor data is determined with a phasor measurement unit residing, for example, at a feeder at the bay level of substations or at branching points along transmission lines. A voltage phasor represents, for example, a voltage of the feeder or line, while a current phasor represents current flowing through the feeder or line.

The phasor data represents a phasor and may be a polar number, the absolute value of which corresponds to either the real magnitude or the RMS value of a quantity, and the phase argument to the phase angle at zero time. Alternatively, the phasor may be a complex number having real and imaginary parts or the phasor may use rectangular or exponential notation. By contrast, conventional sensing devices used in power networks generally measure only scalar, average representations, such as the RMS value of a voltage, current etc.

The phasor data is collected from phasor measurement units (PMUs) that are distributed over a large geographic area, i.e. over tens to hundreds of kilometers. Since the phasor data from these disparate sources are analysed in conjunction, they must refer to a common phase reference. Therefore, the different phasor measurement units must have local clocks that are synchronised to within a given precision. Such a synchronisation of the phasor measurement units is preferably achieved with a known time distribution system, for example the global positioning (GPS) system. In a typical implementation, the phasor data 9 is determined at least every 200 or every 100 or preferably every 20 milliseconds, with a temporal resolution of preferably less than 1 millisecond. In a preferred embodiment of the invention, the temporal resolution is less than 10 microseconds, which corresponds to a phase error of 0.2 degrees. Each measurement is associated with a time stamp derived from the synchronised local clock. The phasor data therefore preferably comprises time stamp data.

FIG. 2 schematically shows an information flow and function structure of a system for adapting conventional protection devices according to the invention. The phasor measurement units 1,1',1",1'" again transmit phasor data to the central processing device 2. The central processing device 2 is configured to change 5 values of predetermined parameters that affect the protection functions implemented in the local protection devices 3,3'.

In a preferred variant of the invention, the adaptation 5 of parameters is effected in a protection system that does not provide redundant protection functions but only adapts parameters of local protection devices 3,3'.

In a first preferred variant of the invention, adapted parameters are estimated network parameters, for example line impedances or equivalent model source voltages. These parameters are used, explicitly or implicitly, in the protection functions. According to the state of the art, they were assumed to be constant. Updating them according to phasor measurements such that they represent an actual state of the network increases the accuracy of the existing local protection functions and also of protection functions implemented in the central processing device 2.

In a second preferred variant of the invention, the parameters being adapted are limits or thresholds for monitored variables within local protection devices 3,3'. The local protection devices 3,3' are configured to trigger a protective action when such a monitored variable exceeds its limit. The protective action typically is the disconnecting of a line or a load. According to the state of the art, such threshold values are determined from offline system studies. Therefore high reserve margins are necessary. With the central processing device 2 providing online information about the actual system state, the overload protection devices are adapted or temporarily blocked. Examples for such an adaptation of traditional local protection functions shall be given further on, in the context of overcurrent protection and distance protection.

Figure 5:
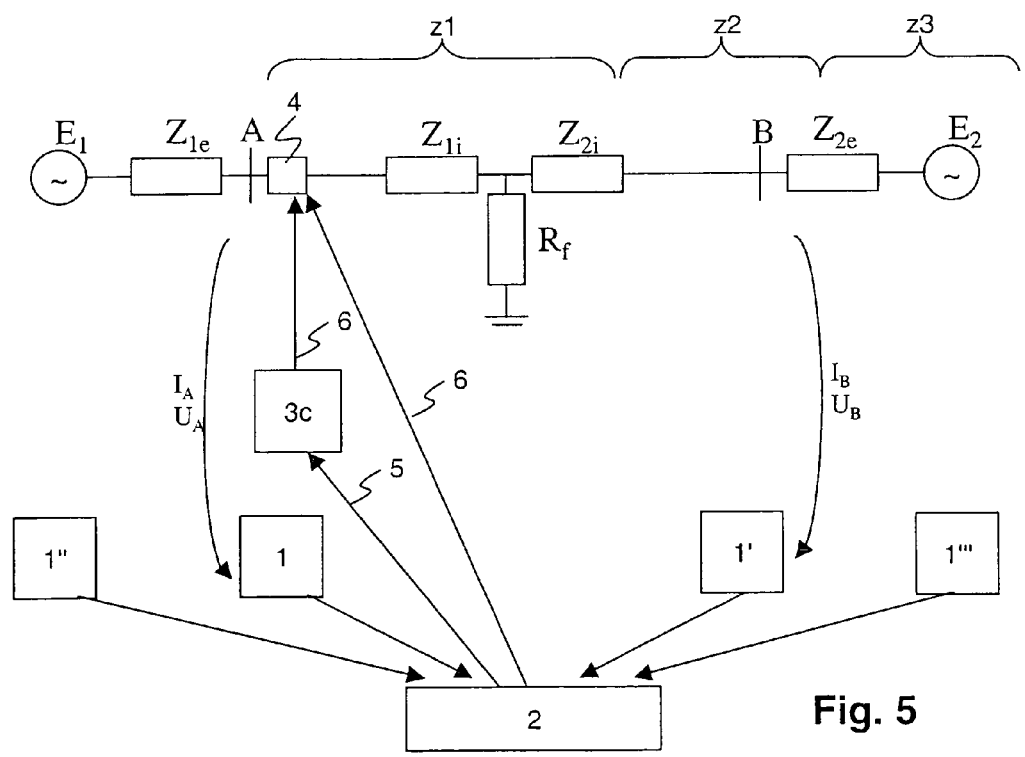
FIG. 5 schematically shows an information flow and function structure for redundant distance protection.

The structures and information flows of FIG. 1 and FIG. 2 may be implemented alternatively or simultaneously, using the same measurement, communications and computing hardware. The FIGS. 3 through 5 show mainly the same elements as in FIGS. 1 and 2, but only those that are required for the specific situation of overcurrent protection, differential protection and distance protection, respectively.

FIG. 3 schematically shows an information flow and function structure for redundant overcurrent protection. The function of a local overcurrent protection device 3a is redundantly implemented by means of a first phasor measurement unit 1 and the central processing device 2. A first circuit breaker 4 is configured to accept commands 6 from both the overcurrent protection device 3a and from the central processing device 2. Continuous measurements $I_A$, $U_A$ by the first phasor measurement unit 1 are processed by the central processing device 2 which, when an overcurrent is detected, sends a disconnecting command 6 to the first circuit breaker 4. The line to be protected lies between a first bus A and a second bus B. Network sections adjoining the line are reduced to equivalent circuits, e.g. Thévenin equivalent circuits.

For the redundant operation, the first phasor measurement unit 1 alone is sufficient. The second and further phasor measurement units 1',1",1''' are optionally required for the adaptation 5 of protection function parameters. In the adaptation 5 according to the invention, a current threshold in the overcurrent protection device 3a is modified 5 in accordance with measurements made by the entirety of phasor measurement units 1,1',1",1'''.

In a preferred variant of the invention, the adaptation 5 of the current threshold in the overcurrent protection device 3a and/or the central processing device 2 takes estimates of the network state into account. Such estimates are represented by or computed from parameters of equivalent circuits represented by $E_1$, and $Z_{1e}$ and $E_2$ and $Z_{2e}$. These parameters are, for example, computed from measurements made by the further phasor measurement units 1",1'''. etc.

In a preferred variant of the invention, the adaptation 5 involves a measure of the stability of the network. The central PMU system provides a voltage stability indicator $I_{vs}$. An example of such a stability indicator based on phasor measurements is described in EP-A-1 134 867. Said application suggests shutting down loads when a stability margin gets too small. According to the present invention, the disconnection of lines is temporarily inhibited, for the following reasons: When the network stability indicator indicates closeness to instability, this means the system is highly stressed and losing a device or line would probably lead to a collapse. In order to prevent this, the local overcurrent protection device 3a is set to be more tolerant by reducing its security margin, i.e. by increasing the standard maximum allowed current $I_{max0}$ or by increasing a reaction time $t_{react}$:

$$I_{max}=I_{max0}+f(I_{vs}) \text{ or } t_{react}=f(I_{vs})$$

This helps to avoid an additional device or line switching while temporarily accepting a higher stress on the device.

In another preferred variant of the invention, a measure of oscillations is taken into account in the adaptation: With data from one or more of the time synchronized phasor measurement units 1,1',1",1''', an oscillation indicator values $I_0$ is computed. $I_o$ is computed e.g. by means of an integral criterion over a predetermined time. A simple variant of an oscillation indicator is implemented by integrating the absolute value of the difference between a current or voltage value and its average value over time.

When the centralized unit detects system oscillations, an overcurrent overload protection device is blocked for a while, e.g. by increasing its maximum allowed current $I_{max}$:

$$I_{max} = \begin{cases} I_{max0} & \text{for } I_0 < I_{0\,set} \\ \infty & \text{for } I_0 \geq I_{0\,set} \end{cases}$$

This avoids an unnecessary overreaction caused by the current swinging temporarily over the usual maximum value.

Other protection thresholds that are adapted in a similar fashion are thermal overload limits, over- and undervoltage, over- and underfrequency.

FIG. 4 schematically shows an information flow and function structure for redundant differential protection. The function of a first differential protection device 3b and a second differential protection device 3b' is redundantly implemented by means of a first phasor measurement unit 1, a second phasor measurement unit 1' and the central processing device 2. As above, circuit breakers 4,4' are controllable by the central processing device 2 and/or by associated differential protection devices 3b,3b'. The conventional differential protection devices 3b,3b' exchange current and/or phase information 7.

The central processing device 2 processes current measurements by the phasor measurement units 1,1': If the difference between the currents flowing into and out of the line exceeds a certain threshold value, a fault current is detected. As a protective action, the central processing device 2 causes the line to be disconnected, preferably at both ends, by means of the circuit breakers 4,4'.

The arrangement according to FIG. 4 may also be used to implement the function of a phase comparison relay: The phases of current and/or voltage at both sides of the line are measured with the phasor measurement units 1,1' and compared in the central processing device 2. If the phase difference exceeds a given threshold, then a fault is assumed to have occurred, and the line is disconnected, usually at both ends.

In a preferred embodiment of the invention, for a situation in which power usually flows only in one direction, one conventional phase comparison device may be omitted: At the sending end, at which power is delivered to the line, only a first phasor measurement unit 1 is installed, whereas the receiving end has an associated second phasor measurement unit 1' and a phase comparison device. The phase signals are compared in the central processing device 2 or transmitted to the phase comparison device located at the receiving end. Upon detection of a sufficiently large phase error, the circuit breakers 4,4' are opened.

FIG. 5 schematically shows an information flow and function structure for redundant distance protection: The function of a distance protection device 3c is redundantly implemented by means of a first phasor measurement unit 1, a second phasor measurement unit 1' and the central processing device 2. As above, a first circuit breaker 4 is controllable by the central processing device 2 and/or by the associated distance protection device 3c. In a preferred embodiment of the invention, remote phasor measurement units, represented in FIG. 5 by a third phasor measurement unit 1" and a fourth phasor measurement unit 1''', are used. More than two remote phasor measurement units 1',1''' may be used, although only two are shown in the figure.

A distance protection relay measures an impedance observed in a certain direction, e.g. when "looking into" line AB in FIG. 5 from point A. The network equivalent in FIG. 5 represents the usual model for fault situations. It is shown here exemplarily for a phase to ground fault of a single line. Double lines or other faults are handled accordingly. If the observed impedance changes, there must be a fault with an impedance Rf. A distance protection relay is parameterized such that it covers ideally only the line where it is installed. To avoid an overreach into other lines, a security margin is set, which causes a the relay to cover only 50% to 80% of the line. This means that a fault in the last 50% to 20% of the line length is switched off later than theoretically necessary. This basic functionality is called "zone 1" functionality. Other impedance settings are used to cover remote distances, as backups for the protection installed there. "Zone 2" covers, for example, the next substation and a part of the next line. "Zone 3" covers adjacent lines. Both zone 2 and zone 3 protection are configured to cause protective action slower than zone 1, resulting in a time-coordinated and staggered backup for the zone 1 protection in the overlapping zones. Zone 2 acts usually within about 0.4 second, and zone 3 within 1 to 2 seconds. In FIG. 5, the zones 1, 2 and 3 with respect to bus A are labelled as z1, z2 and z3, respectively.

Zone 3 protection is not very reliable since, due to changing line parameters $Z_{1i}$, $Z_{2i}$ and load situations, it is hard to configure. The main drawback is that only local information at the place where the relay is located is used. If the fault impedance Rf is neglected, the calculated impedance $Z_{1i,calc}$ is e.g. equal to a difference of Phase Voltages at location A, divided by a difference of Phase Currents for a phase to phase fault. If the fault impedance Rf is not neglected, $Z_{1i,calc}$ is $Z_{1i}+Rf(1+I_B/I_A)$. This signifies that remote information from point B is necessary to get accurate information for the location of the fault.

Three methods are applicable to avoid these drawbacks. The first one is to use local and remote information at the two points A and B from PMU measurements. This is proposed in Chen, et. al. "A new adaptive PMU based protection scheme for transposed/untransposed parallel transmission lines", IEEE Transactions on Power Delivery, Vol. 17, No. 2, April 2002, shows an adaptive distance protection system.

The distance D between bus A and the fault is a function of $U_A$, $U_B$, $I_A$, $I_B$, from which also the line parameters are calculated and adapted. From these measurements, which change drastically during the fault, trigger signals for fault detection are generated as well. The fault location and determination calculations are performed according to standard formulae derived from symmetrical component descriptions of the situation for particular faults, such as phase to ground or phase to phase, based on the network equivalent of the line between bus A and bus B as in FIG. 5. Well-known methods for this purpose are shown in Anderson, P.M. "Analysis of faulted power systems", ISBN 0-7803-1145-0, IEEE Press, 1995, pp. 37–53 and 347–353.

If the PMUs are distributed over a particular area of the power system, then information from different points can be evaluated to detect faults and their location. If a remote point C to the right of B is equipped with a PMU, then zone 2 and zone 3 protection can be implemented by applying the formula for the fault location and incorporating also the load current at point B. The second possibility is not to measure at point C but to determine a Thévenin equivalent for the remote area. This means determining $Z_{2e}$ and $E_2$ from the measurements at point B before the fault according to a method as shown in e.g. EP-A-1 211 775. The voltage at $E_2$ and the current from $E_2$ to B can be used to locate the fault in point B or between B and E2 with the common formula according to the standard procedure. With this approach, the zone 2 or zone 3 protection functionality can be implemented more accurate than with todays methods.

A third alternative method is to determine the actual values for the line parameters according to FIG. 5 and the Thévenin equivalents at both ends continuously during fault-free operation, and to store this model in the local relay at point A, as shown e.g. in Xia, et al. "Adaptive Relay Setting for Stand-Alone Digital Distance Protection", IEEE Transactions on Power Delivery Vol. 9, No. 1, January 1994. The relay then determines and locates the fault according to the updated model in FIG. 5 and from on-line measured local data relating to point A. Usually the parameters $E_1$, $E_2$, $Z_{1e}$, $Z_{2e}$ of Thévenin equivalent circuits describing the network sections connected to the buses A,B at the two ends of the line are assumed to be known and fixed or taken from a SCADA-EMS system. The line parameters are assumed to be fixed as well. With only local measurements of the relay at point A the fault is detected and located, but based on the extended model under consideration of the Thévenin equivalents.

According to the invention, the parameters $E_1$, $E_2$, $Z_{1e}$, $Z_{2e}$ and the line parameters are continuously updated from measurements taken by the phasor measurement units 1,1', 1",1"', i.e. including remote phasor measurement units 1",1"'. A general procedure for determining network parameters from distributed phasor measurements is described in EP Publication EP 1 324 455 A1 (application No. 01811253.2), filed Dec. 21, 2001. The protection scheme e.g. according to the Xia et al. paper cited above is then applied, but using the updated values of $E_1$, $E_2$, $Z_{1e}$, $Z_{2e}$.

In preferred embodiments of the invention, zone 3 protection is duplicated redundantly or replaced by a PMU-based system. In contrast to zone 3 protection, where a remote circuit breaker switches, only the faulted line is switched off and not larger part of the system.

Communication delays between the phasor measurement units 1,1',1",1"' and the central processing device 2 and the circuit breakers 4,4' are acceptable, since the zone 3 time delay is about 1 second.

In a preferred embodiment of the invention, adaptation 5 of distance protection parameters is achieved as follows. Distance protection, in particular zone 3 protection, is critical during system oscillations. Oscillations are therefore detected by configuring the central processing device 2 to determine an oscillation indicator $I_o$. Zone 3 protection is then inhibited by increasing the reaction time $t_{zone}$:

$$t_{zone3}=f(I_o)$$

This avoids overreactions due to temporary swings that do not represent an actual threat to network or component integrity.

In a further preferred embodiment of the invention, the conventional protection functions are partially or altogether omitted, and protection is realised by the central processing device 2 alone, based on the distributed phasor measurements.

In all embodiments shown, it is not necessary that a PMU be located exactly at the location, i.e. substation or feeder of a corresponding circuit breaker 4,4': In a further preferred embodiment of the invention, phasor values for currents and voltages valid for a specific point in the network are computed from phasor values measured at other locations. This is done by applying Kirchhoff's laws, as shown e.g. in European Patent Application No. 01811253.2, filed Dec. 21, 2001.

LIST OF DESIGNATIONS 1 first phasor measurement unit
1' second phasor measurement unit
1" third phasor measurement unit
1'" fourth phasor measurement unit
2 central processing device
3 first local protection device
3' second local protection device
3a overcurrent protection device
3b first differential protection device
3b' second differential protection device
3c distance protection device
4 first circuit breaker
4' second circuit breaker
5 parameter adaptation
6 switching command
7 current or phase information
z1 zone 1
z2 zone 2
z3 zone 3
A first bus f
B second bus

What is claimed is:

1. A method for the protection of an electric power transmission network, where local protection functions are implemented by a plurality of local protection devices located at a first plurality of locations throughout the network, wherein the method comprises the steps of
    measuring phasor data for voltages and currents at a second plurality of locations of the network,
    transmitting said phasor data to a central processing device,
    emulating, in the central processing device, local protection functions that are implemented in the local protection devices, and
    executing, in accordance with a given redundancy strategy, control commands that are issued redundantly by the local protection devices and by the central processing device.

2. Method according to claim 1, wherein a protection function emulated in the central processing device is one of a differential protection function, a phase comparison function, an overcurrent detection function, or a thermal overload detection function.

3. Method according to claim 1, wherein a protection function emulated in the central processing device is a distance protection function.

4. Method according to claim 1, comprising the step of
    adapting values of predetermined parameters that are used in the protection function in accordance with measured phasor values.

5. Method according to claim 4, wherein the predetermined parameters are impedances of lines or equivalent circuits.

6. Method according to claim 4, wherein the predetermined parameters are limit values that, when exceeded, cause protective action to be taken.

7. Method according to claim 6, comprising the steps of
    computing, from measured phasor values, a stability measure of the network, and
    adapting limit values in accordance with said stability measure.

8. Method according to claim 4, wherein the distance protection function for a power line linking a first bus of the network to a second bus of the network comprises at least one of the steps of
    determining, an equivalent representation of the network as observed at the first bus, and
    determining an equivalent representation of the network as observed at the second bus,
    and the step of
    computing a distance protection algorithm that incorporates at least one of the equivalent representations of the network as observed at the first or second bus, respectively.

9. A computer-readable medium having a computer program stored thereon for execution on a data processing unit to perform the protection of an electric power transmission network, which computer program, when being executed, performs the steps according to claim 1.

10. Data processing system for the protection of an electric power transmission network comprising means for carrying out the steps of the method according to claim 1.

11. A central processing device for the protection of an electric power transmission network comprising a plurality of local protection devices, the latter being located at a first plurality of locations throughout the network and implementing local protection functions, where the central processing device comprises means for
    emulating, based on phasor data for voltages and currents measured at a second plurality of locations of the network and transmitted to the central processing device, local protection functions that are implemented in the local protection devices, and
    issuing control commands that are redundant with control commands issued by the local protection devices.

* * * * *